(12) United States Patent
Lei et al.

(10) Patent No.: US 8,775,422 B2
(45) Date of Patent: Jul. 8, 2014

(54) DETERMINING CORE GEOGRAPHICAL INFORMATION IN A DOCUMENT

(75) Inventors: Guo Ping Lei, Hangzhou (CN); Chuan Wen Chen, Hangzhou (CN); Xiao Shuan Li, Hangzhou (CN); Wei Jia Liu, Hangzhou (CN); Na Ma, Hangzhou (CN); Ming You Wang, Hangzhou (CN); Xuan Wang, Hangzhou (CN); Hong Xi Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/739,230

(22) PCT Filed: Aug. 28, 2009

(86) PCT No.: PCT/US2009/055435
§ 371 (c)(1),
(2), (4) Date: Apr. 22, 2010

(87) PCT Pub. No.: WO2010/025415
PCT Pub. Date: Mar. 4, 2010

(65) Prior Publication Data
US 2011/0145235 A1 Jun. 16, 2011

(30) Foreign Application Priority Data
Aug. 29, 2008 (CN) .......................... 2008 1 0135525

(51) Int. Cl.
*G06F 17/30* (2006.01)
(52) U.S. Cl.
USPC .......................................................... 707/730
(58) Field of Classification Search
None
See application file for complete search history.

(56) References Cited

U.S. PATENT DOCUMENTS

| | | | |
|---|---|---|---|
| 7,996,379 B1 * | 8/2011 | Jain | 707/706 |
| 2003/0046263 A1 | 3/2003 | Castellanos et al. | |
| 2004/0205457 A1 * | 10/2004 | Bent et al. | 715/500 |
| 2004/0236730 A1 * | 11/2004 | Frank | 707/3 |
| 2005/0108213 A1 | 5/2005 | Riise et al. | |
| 2005/0278378 A1 * | 12/2005 | Frank | 707/104.1 |
| 2006/0004752 A1 * | 1/2006 | Harel et al. | 707/6 |

(Continued)

FOREIGN PATENT DOCUMENTS

| | | |
|---|---|---|
| JP | 08153121 | 6/1996 |
| JP | H09293079 | 11/1997 |
| WO | WO2007087629 | 8/2007 |

OTHER PUBLICATIONS

Naaman et al. "Assigning Textual Names to Sets of Geographic Coordinates". Science Direct, pp. 418-435, 2005.*

(Continued)

*Primary Examiner* — Yuk Ting Choi
(74) *Attorney, Agent, or Firm* — Lee & Hayes, PLLC

(57) ABSTRACT

A method determines core geographical information in a document by computing a score for each geographical name found in the document. The computation of the score uses the appearance frequency of the respective geographical name and positional weights assigned to various types of appearance positions of the geographical name in the document. The system determines the core geographical information in the document based on the scores of the geographical names found in the document. The method may further compute aggregated scores of geographical regions related to the geographical names and determine the core geographical information using both the aggregated scores of geographical regions and the scores of individual geographical names to increase accuracy.

20 Claims, 4 Drawing Sheets

(56) References Cited

U.S. PATENT DOCUMENTS

| | | |
|---|---|---|
| 2006/0149734 A1 | 7/2006 | Egnor et al. |
| 2006/0149774 A1* | 7/2006 | Egnor .................. 707/102 |
| 2007/0118430 A1 | 5/2007 | Wiseman et al. |
| 2007/0198495 A1 | 8/2007 | Buron et al. |
| 2007/0244858 A1 | 10/2007 | Streetman |
| 2007/0288437 A1 | 12/2007 | Xia |
| 2008/0033944 A1 | 2/2008 | Frank |
| 2008/0097966 A1 | 4/2008 | Choi et al. |
| 2008/0104019 A1 | 5/2008 | Nath |
| 2008/0243821 A1 | 10/2008 | Delli Santi et al. |
| 2008/0270375 A1* | 10/2008 | Nanduri et al. .................. 707/5 |
| 2008/0281812 A1* | 11/2008 | Sotos ............................... 707/5 |
| 2008/0319990 A1 | 12/2008 | Taranenko et al. |
| 2009/0063424 A1 | 3/2009 | Iwamura et al. |

OTHER PUBLICATIONS

The European Search Report mailed Oct. 20, 2011 for European patent application No. 09810689.1, 12 pages.

Liberman, et al., "Steward: Architecture of a Spatio-Textual Search Engine", 15th ACM GIS, Nov. 7, 2007, pp. 1-8.

Woodruff, et al., "Gipsy: Automated Geographic Indexing of Text Documents", Journal of the American Society for Information Science, Jan. 1, 1994, pp. 645-655, retrieved from the internet at http://citeseer.ist.psu.edu/viewdoc/summary?doi=10.1.1.33.4813 on Oct. 12, 2011.

Translated copy of the Japanese Office Action mailed Sep. 3, 2013 for Japanese patent application No. 2011-525257, a counterpart foreign application of U.S. Appl. No. 12/739,230, 8 pages.

Translated copy of the Japanese Office Action mailed Apr. 8, 2014 for Japanese patent application No. 2011-525257, a counterpart foreign application of U.S. Appl. No. 12/739,230, 6 pages.

* cited by examiner

DETERMINING CORE GEOGRAPHICAL INFORMATION IN A DOCUMENT

RELATED APPLICATIONS

This application is a national stage application of international patent application PCT/US09/55435, filed Aug. 28, 2009, entitled "DETERMINING CORE GEOGRAPHICAL INFORMATION IN A DOCUMENT", which claims priority from Chinese patent application, Application No. 200810135525.0, filed Aug. 29, 2008, entitled "METHOD AND SYSTEM OF DETERMINING CORE GEOGRAPHICAL INFORMATION IN A DOCUMENT".

TECHNICAL FIELD

The present disclosure relates to the field of data processing, and particularly to methods and systems of determining core geographical information in a document.

BACKGROUND

Among services provided by the Internet such as keyword search (including content provision of aggregated news and information, for example), document content may be provided according to the relevant geographical information found in the documents. However, with these services provided on the Internet, existing technologies merely extract geographical information that appears within a document when categorizing the document according to its geographical information. Different geographical information may however appear in the same document, and all geographical information may be extracted from the document without differentiation. In reality, core geographical information generally exists in the descriptive content of a document. For example, among the news reports of Sichuan earthquake, the location name "Sichuan" may be extracted as geographical information. At the same time, the news may also mention donations from other provinces and cities to Sichuan. Using an existing method, such geographical information as Guangdong and Beijing may also be extracted. Merely judging from the geographical information extracted this way, the document content might seem as if the news or the information had happened in another place, such as Beijing or Guangdong. At the same time, core geographical information of these news reports should really be recognized as "Sichuan" in this case.

In other words, because existing technologies merely extract geographical information that appears within a document on its face value, multiple pieces of geographical information may be extracted without discerning the true core geographical information of the document from among these pieces of geographical information. This may lead to an inaccurate result for services that are based on the extracted geographical information, such as content provision based on search, and geographically aggregated news and information.

SUMMARY OF THE DISCLOSURE

Disclosed are a method and a system for determining geographical information in a document. The method determines core geographical information in a document by computing a score for each geographical name found in the document. The computation of the score uses the appearance frequency of the respective geographical name and positional weights assigned to various types of appearance positions of the geographical name in the document. The system determines the core geographical information in the document based on the scores of the geographical names found in the document. The method may further compute aggregated scores of geographical regions related to the geographical names and determine the core geographical information using both the aggregated scores of geographical regions and the scores of individual geographical names to increase accuracy.

In one embodiment, the method identifies appearances of a plurality of geographical names in the document; determines one or more frequencies of each geographical name's appearances in the document; assigns one or more positional weights to each geographical name according to positions of the geographical name's appearances in the document; and computes a score of each geographical name based on the one or more frequencies and the one or more positional weights of the respective geographical name.

In one embodiment, in order to determine the core geographical information in the document based on the scores of the plurality of geographical names, the method computes aggregated scores for a plurality of geographical regions at a comparable or common level; identifies the highest scoring geographical region among the plurality of geographical regions; and takes the highest scoring geographical name in the highest scoring geographical region to be core geographical information of the document. The geographical regions selected for this purpose are those related to the geographical names found in the document. In general, the geographical names are at the same or lower levels relative to the related geographical region. Such geographical regions are identified using a geographical information database containing a list of geographical names and hierarchical relationships among the list of geographical names.

The system for determining core geographical information in a document may include a computer having a processor and a data storage. The processor is programmed to perform the acts of the processes disclosed herein. The geographical information database may be stored in the data storage. In a typical application, the computer is a server connected to the Internet.

In preferred embodiments, the disclosed method and system determines the core geographical information in a document accurately by using a deliberate algorithm to score the geographical names and a geographical information database to further interpret the scores.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The exemplary embodiments of a method and a system for determining core geographical information in a document are described in detail below using the accompanying figures and implementation methods.

In this disclosure, the term "core geographical information" refers to geographical information that is the most relevant to a central theme or focus of the content or the story of a second document. The core geographical information of a document may be used to determine its relevance to a certain group of users who are located at, interested in, or otherwise related to a certain geographical location indicated by the geographical information.

Figure 1:
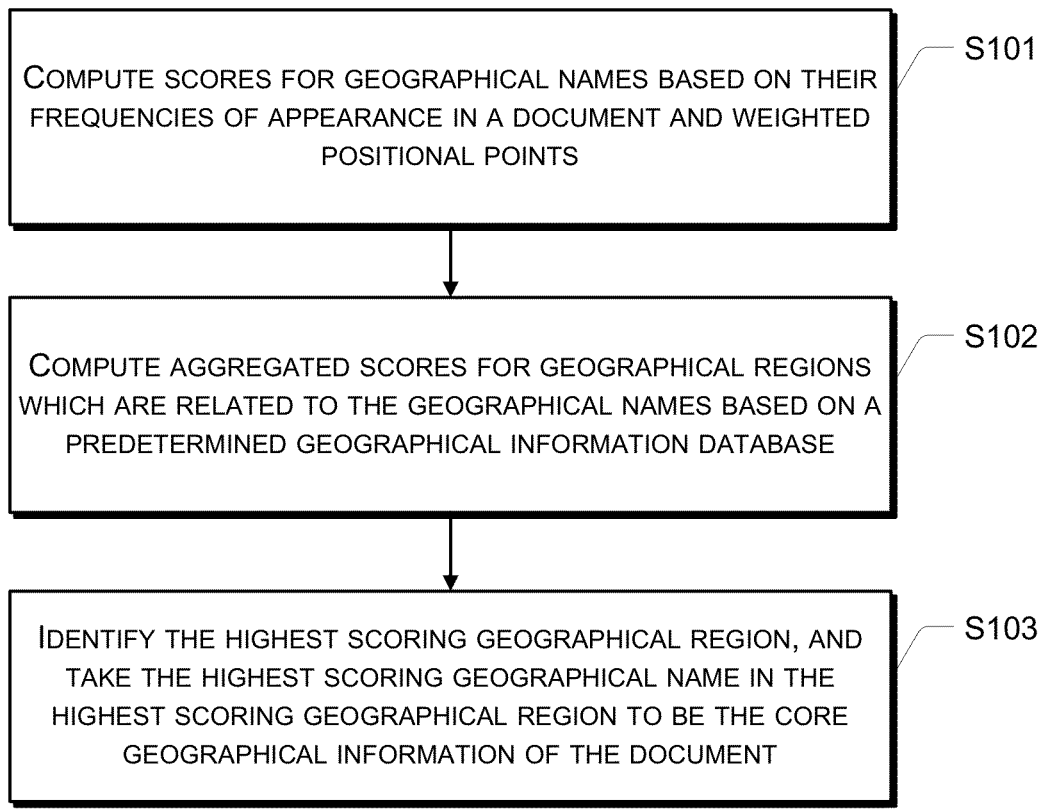
FIG. 1 shows a flow chart illustrating an exemplary method in accordance with the present disclosure.

FIG. 1 shows a flow chart illustrating an exemplary method for determining core geographical information in a document in accordance with the present disclosure. The procedure is described as follows. In this description, the order in which a process is described is not intended to be construed as a limitation, and any number of the described process blocks may be combined in any order to implement the method, or an alternate method.

Block S101: A computer (e.g., a server operated by an Internet content provider) computes scores for geographical names. Usually, in order to do this, a document is made available to the computer to be analyzed. A typical document for this purpose is a web page, but can be any other type of documents that is electronically accessible by users. The computer may first identify the appearances of various geographical names in the document. The score of each geographical name is separately calculated at this block.

In one embodiment, in order to compute the score of a geographical name, one or more frequencies of each geographical name's appearances in the document is first determined In the simplest form, a single overall frequency is calculated by the totaling the number of appearances of the geographical name in the document. However, the appearances of a geographical name may be categorized into different types (e.g., according to different type of positions where the geographical name appear, as further described below), and a separate frequency may be determined for each type of appearances.

With frequencies is determined, the computer assigns one or more positional weights to each geographical name according to positions of the geographical name's appearances in the document. Such positional weights vary from one type of position to another to give proper weight consideration of the various types of appearance positions in the document. The positional weights may either be weight coefficients or weight factors multiplying the frequency score of the respective type of appearances of the geographical name in the document, or weighted positional points added to the frequency score of the respective type of appearances of the geographical name in the document. The positional weights may be predefined, or determined and adjusted in actual use. This will be further discussed below in detail.

The computer than computes a score of each geographical name based on the frequencies and the positional weights of the respective geographical name.

An exemplary method of computing scores for geographical names based on respective frequencies of the geographical names in a document and predefined weighted positional points is described as follows.

In this embodiment, the computer first computes a frequency score based on the one or more frequencies of each geographical name, and a positional score based on the one or more positional weights of the geographical name. The computer then adds the positional score to the frequency score to obtain the score of the geographical name.

For example, a score for a certain geographical name in the document is counted as a sum of its frequency and one or more weighted positional points associated with the respective positions the geographical name has appeared in the document. The score may be calculated using the following formula:

$$\text{Score} = \text{Frequency} + \text{Weighted Positional Points}$$

A weighted positional point is assigned to a certain type of position in the document to reflect the relative level of relevance of an appearance at that position. For example, three points may be assigned to a position that is in a title in the document, two points may be assigned to a position that is in the first text paragraph, and one point may be a sign to a position that is in other text paragraphs. Such assignments of weighted positional points reflect a relatively higher relevance of an appearance in the title and an appearance in the first paragraph of a story. In general, a geographical name appearing in the title has a high possibility of being the core geographical information of the document than a geographical name that appears in other places of the document. A geographical name appearing in the first paragraph of a story may be less likely to be the core geographical information than one appearing in the title, but still be more likely than a geographical name appearing in subsequent paragraphs. In ordinary documents, especially documents related to news and current affairs, the first text paragraph is generally an overview of an event described in that document.

An example is given below for illustration. Suppose a geographical name "Mao County" appears once in the title, three times in the first text paragraph, and seven times in the other text paragraphs, a score for this geographical name may be calculated to be $(1+3+7)+(3+2+1)=17$ according to the above formula.

The same formula may be used for calculating the scores of other geographical information that appears in the document.

It is appreciated other reasonable storing scheme using frequencies of geographical names and weighted positional points may be implemented. In general, any scheme that reasonably takes into account of the relative levels of contribution by general frequencies of appearances and weighted positions may be used. In particular, instead of using weighted positional points that add to the frequencies, positional weights used as multiplication factors or coefficients to the respective frequencies may also be used.

It is also noted that the scoring method based on frequencies and positions of geographical names may be determined and optimized by considering characteristics of geographical names appearing in a large number of documents such as news and information.

Scores for different geographical names appearing in the same document are computed according to the same rules. If different scores are obtained for different geographical names, a subsequent procedure will then determine which geographical name is the core geographical information of the document based on the scores.

Moreover, it should be noted that geographical names may often appear consecutively to each other or in conjunctive combinations of a document. Take the news in a web page as an example, where news related to Huh District of Xiamen City is reported. The two geographical names Xiamen City and Huh District appear consecutively, e.g., as in " . . . two betting stations in Huh District of Xiamen City . . . " In reality, "Huli District of Xiamen City" is indeed the core geographical information of this document. A large number of examples show that geographical names appearing conjunctively have a higher chance of being the core geographical information. Therefore, it is reasonable for the combinations of the geographical names that appear conjunctively to have a higher weight such that the geographical names appearing in these combinations may have higher probabilities of being recognized as the core geographical information in the end.

Accordingly, the following procedure may be used. For those geographical names appearing conjunctively or consecutively, scores for each geographical name therein are favorably affected by a weight, such as increased by a predefined value.

For example, assume geographical name "Xiamen City" has a score of seven (7), and geographical name "Huli District" has a score of two (2). With a consecutive appearance of these two geographical names (such as "Huli District of Xiamen City") in the document, scores for Xiamen City and Huli District may be further increased by a predefined value. For example, if the predefined value of the increase is one (1), the final score for the geographical name "Xiamen City" is 7+1=8, and the final score for the geographical name "Huli District" is 2+1=3.

On the other hand, names of news agencies may be included in a document, and these names generally contain geographical names. However, these geographical names are unlikely to be the core geographical information of the event described in the document. As such, the appearances of geographical names in the names of the news agencies need to be filtered out, as will be illustrated in a step after S101. For example, Beijing Daily and Guangzhou Daily include Beijing and Guangzhou, which are parts of the names of the news agencies and should not be included in the above score computation.

In practice, a news agency name table may be set up and to include the names of commonly known news agencies such as news agencies, daily newspapers, and news websites. If based on the table a news agency name appears in close proximity prior to and/or after a geographical name, the corresponding instance of the geographical name may be ignored. For example, the phrase "Xinhua—Beijing" may appear in a web page. Although "Beijing" is a geographical name, the appearance of "Beijing" in the phrase "Xinhua (Beijing)" is not counted towards the normal frequency of the geographical name because the appearance is in close proximity to "Xinhua", a new agency name found in the table.

In addition to explicit geographical names, the appearances of geographical names may further include that of any words or phrases which in themselves are not names of geographical locations but are indicative of a certain geographical location. Examples include names of colleges and universities, names of points of interest (POI), names of companies, names of specialties, names of communities, and names of scenic spots, etc. Such words or phrases can be created as an indicator or representation of the related geographical location, and accordingly an appearance of such a word or phrase may be counted as an appearance of the represented geographical name.

For an example, Tsinghua University may represent Wudaokou, Haidian District, Beijing and may be treated as an implicit geographical name associated with that location. Mao' Restaurant (Lanbao Branch) may represent Lanbao International Center, West Dawanglu, Beijing, and be treated as an implicit geographical name associated with that location. The company name TaoBao.com may represent No. 391, Wenerlu, Hangzhou City, Zhejiang, and be treated as an implicit geographical name associated with that location. Well-known product name Westlake Longjing tea may represent Westlake District, Hangzhou City, Zhejing, and be treated as an implicit geographical name associated with that location. Summer Palace may represent Haidian District, Beijing where it is located and be treated as an implicit geographical name associated with that location. Residential neighborhood name Sunshine 100 may represent West Dawanglu, Chaoyang District, Beijing where it is located and be treated as an implicit geographical name associated with that location.

Block S102: The computer calculates scores for each geographical region which is mentioned or involved in the document. This block is carried out in embodiments which take into consideration of the scores of geographical regions related to the geographical names. In these embodiments, the computer may identify geographical regions that are related to geographical names which are at the same or lower levels relative to the geographical region according to a hierarchy of geographical entities, as will be illustrated below. The computer then computes aggregated scores for the multiple geographical regions at a comparable or common level, identify the highest scoring geographical region among the plurality of geographical regions, take the highest scoring geographical name in the highest scoring geographical region to be core geographical information of the document.

In this calculation, for each geographical name mentioned or implied, at least some of the geographical regions which are at, above or below the level of the geographical name mentioned or implied are deemed to have been involved. The geographical regions are determined by affiliated relationships between the geographical names. The affiliated relationships are defined by a physical relationship between the geographical names, and maybe any one or more of territorial relationship, jurisdiction relationship, administrative relationship, municipal relationship, and political relationship. In the following, the affiliated relationships are illustrated based on government administrative relationships for the purpose of illustration.

In some embodiments, such geographical regions and relationships are defined and provided by a geographical information database. Specifically, a geographical information database containing multiple geographical names and affiliating relationships among the geographical names is used to define geographical regions and relationships. For example, the geographical information database may include a geographical name at the province-level (e.g., Sichuan), multiple city-level geographical names that are under the province-level, multiple county-level geographical names that are under each city, multiple district-level geographical names that are under each county, and so forth. Other geographical names at the provincial level and its affiliated lower levels would have similar relationship patterns. The geographical information database may further include other levels such as country-level geographical information with state-level or province-level geographical information included under each country.

Figure 2:
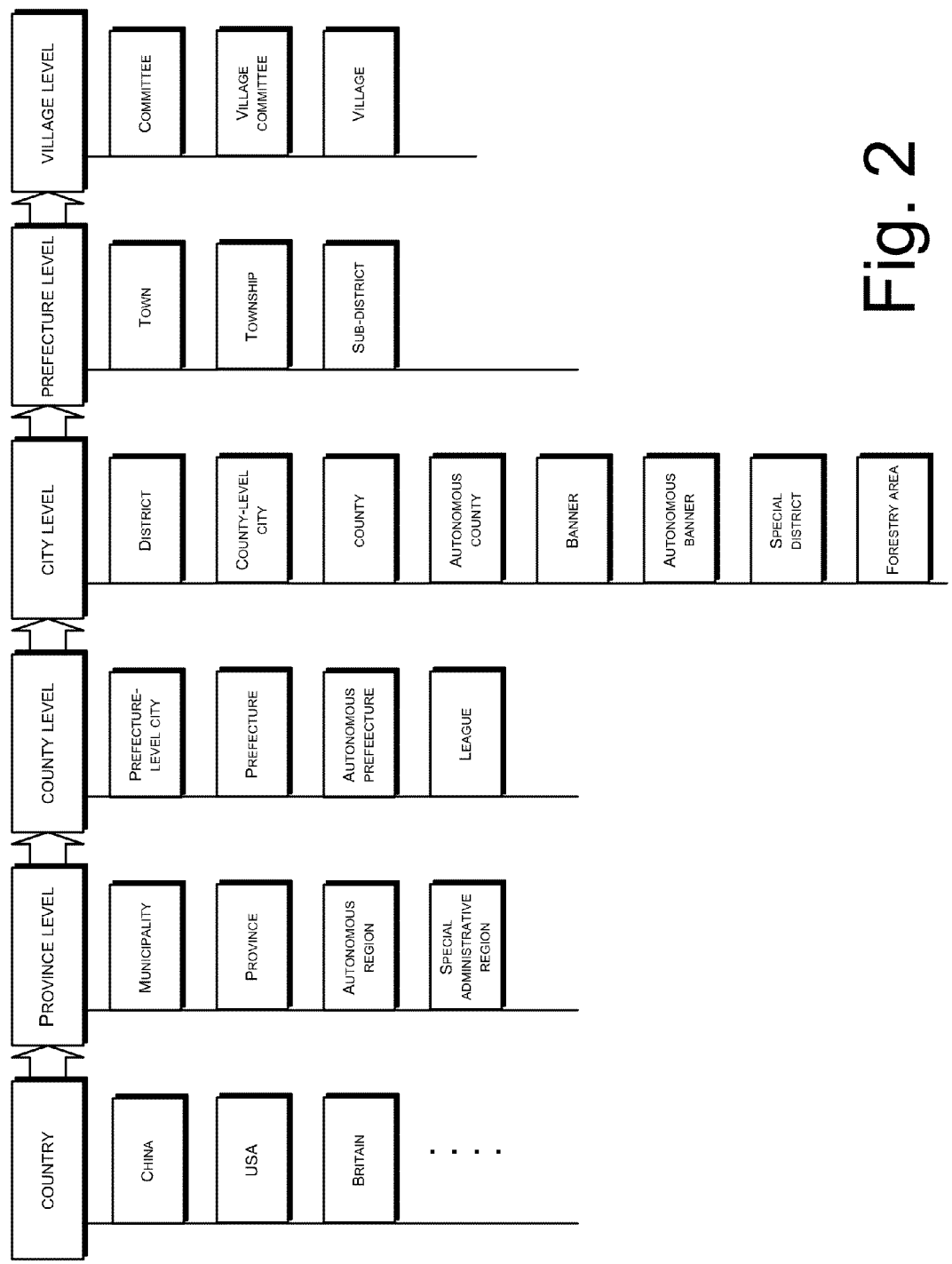
FIG. 2 shows a diagram illustrating an exemplary hierarchy of geographical regions and geographical names as defined by a geographical information database.

FIG. 2 shows a diagram illustrating a hierarchy of geographical regions and geographical names as defined by a geographical information database. The geographical names and the relationships among the geographical regions in the above geographical information database may be organized according to FIG. 2.

Based on the geographical information database, geographical regions that are related to the geographical names found in the document can be obtained. For example, in terms of government administrative relationships, Chaoyang District is below Beijing, and but above subordinate geographical names such as Jianguomenwai Avenue and Dawanglu Road. If the geographical name "Chaoyang District" appears in a document, Beijing is considered as a geographical region related to Chaoyang District which is at a low level collective to Beijing. At the same time, Chaoyang District may also be seen as a region related to further lower-level geographical names such as Jianguomenwai Avenue and Dawanglu Road. If "Beijing" is also found in the document, Beijing is both a geographical name of the document and a geographical region related to the geographical name Beijing at the same level.

At this stage, the computer calculates the scores for each geographical region related to the extracted geographical names according to geographical information database. In one embodiment, the score of a geographical region is the sum of scores of all geographical names at or below the top division level. An example is described below.

Suppose with a certain document, scores for geographical names Chengde, Qinhuangdao, Beijing and Hong Kong Island are determined to be seven, three, nine and three points, respectively. With just these scores, the computer would not be able to correctly determine which of these geographical names represents the core geographical information of the document. In this particular case, the correct answer should be Chengde, which alone does not have the highest score at this point.

However, using the geographical database, the computer determines that both Chengde and Qinhuangdao belong to the geographical region Hebei province. The score for the geographical region Hebei is the sum of the scores for Chengde and Qinhuangdao, and is equal to ten. Beijing belongs to Beijing City, while Hong Kong Island belongs to Hong Kong. Beijing City, Hong Kong and Hebei are at the same or a comparable geographical region level because they are all province-level geographical regions. The score for Beijing City is the score for Beijing and has been determined to be nine. The score for Hong Kong is the same as the score for Hong Kong Island and is equal to three.

Based on the scores for the geographical regions related to the geographical names extracted from the document, the core geographical information of the document can be determined using subsequent procedures.

Block S103: the computer identifies the highest scoring geographical region, and then takes the highest scoring geographical name in the identified geographical region to be the core geographical information of the document. In general, only geographical regions at the same or comparable level are compared with each other to find the highest scoring geographical region.

Figure 3:
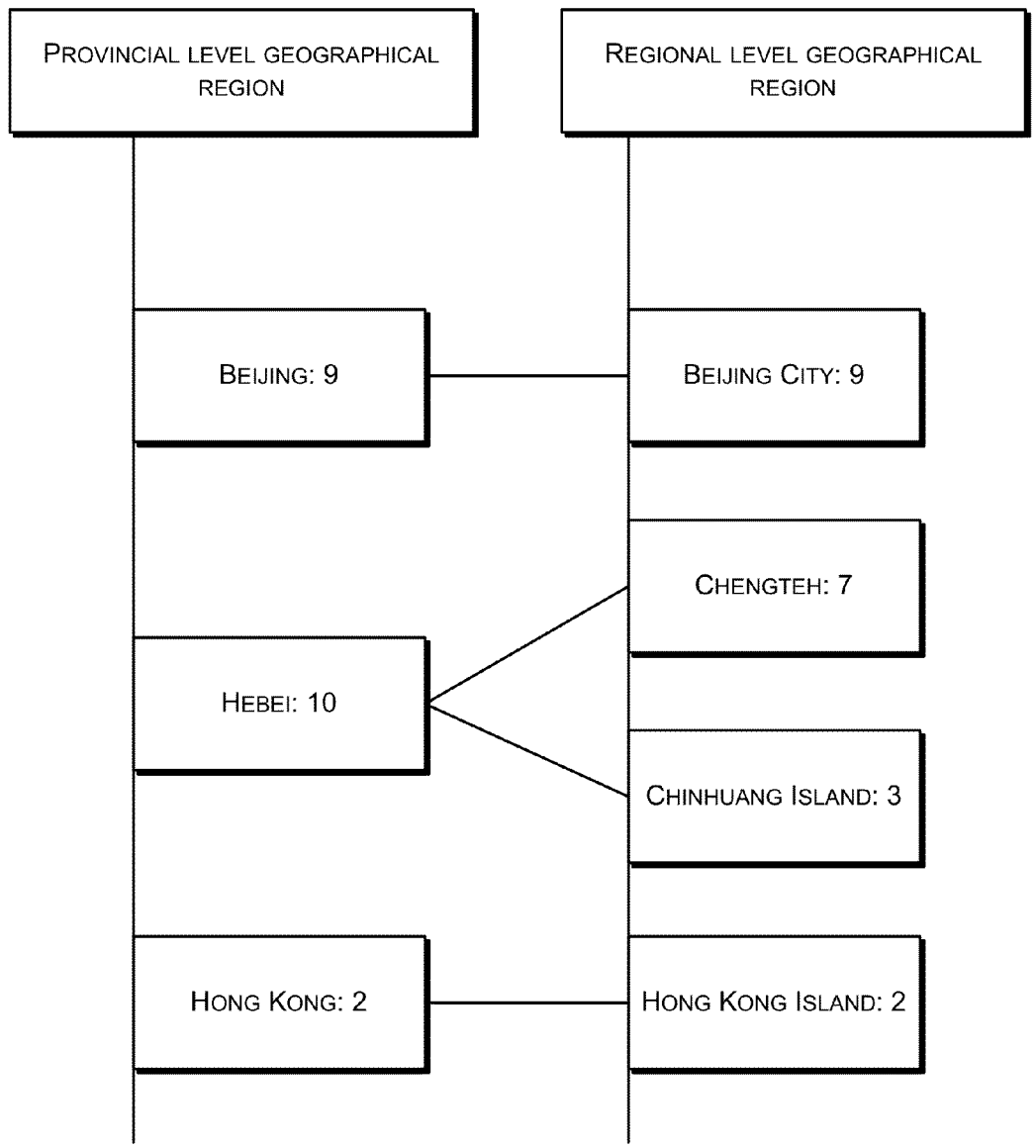
FIG. 3 shows a diagram illustrating an exemplary scoring scheme used in the method in accordance with the present disclosure.

FIG. 3 is a diagram illustrating an exemplary process of determining the core geographical information using the scores of the geographical regions. FIG. 3 shows several province-level of geographical regions and their corresponding sub-level geographical names that were found in the document.

In the above example discussed at block S102, at geographical region level, the scores for Hebei, Beijing and Hong Kong are determined to be ten, nine, and score three, respectively. According to the algorithm of block S103, Hebei is identified to be the highest scoring geographical region. As such, Chengde which has the highest score under Hebei is taken to be the core geographical information of the document.

Therefore, although the score for Beijing (nine) is higher than those for Chengde (seven) and Qinhuangdao (three) in the document, Chengde of Hebei is ultimately determined to be the core geographical information of the document according to the above procedures. This is a more accurate result in fact.

An exemplary embodiment is described further below for illustration. This web document describes the disaster assistance from all over the country in response to Sichuan's earthquake, and mentions a number of geographical names such as Jinan City, Mianyang City, Youxian District, Wenchuan, Beijing City, Xicheng District, Henan, Hubei, Zaoyang, Qingzhen, Jianhe, Hebei province, Yingshan County, Yongde, Panlong, Chonju, Zhejiang, Shanmen, Ouhai, Fuping, Jing County, Wolong, Yingxiu, and Youxian District of Mianyang City. The geographical focus of the story is actually Mianyang City of Sichuan province, and therefore the geographical name "Mianyang City" should be the core geographical information of the document.

According to the scarring formula described in block S101 (assuming exemplary weighted positional points of three, two and one for appearances in the title, in the first text paragraph, and in other text paragraphs, respectively), scores for the geographical names found in the document are separately:

Jinan City: 5; Mianyang City: 9; Youxian District: 5; Wenchuan: 8; Beijing City: 2; District: 2; Henan: 2; Hubei: 3; Zaoyang: 2; Qingzhen: 2; Jianhe: 2; Hebei province: 4; Yingshan County: 2; Yongde: 2; Panlong: 2; Chonju: 2; Zhejiang: 2; Sanmen: 2; Ouhai: 2; Fuping: 2; Jing County: 2; Wolong: 9; and Yingxiu: 5

It is noted that Wenchuan in the above geographical information appears not only three times in the text, but also once in the title. Therefore, the score for Wenchuan is (3+1)+(1+3)=8. Similar rules apply to other geographical names.

Furthermore, among the above geographical names, "Youxian District of Mianyang City" appears conjunctively or consecutively in the document. Based on the score computation method of block S101, the scores for these two geographical names (Mianyang City and Youxian District) are separately increased by one, assuming the above exemplary set of weighted positional points. Similarly, the document contains other conjunctively appearing geographical names such as "Xicheng District of Beijing City", "Zaoyang of Hubei" and "Shanmen of Zhejiang". The scores of these geographical names are therefore increased by the predefined weighted positional points.

According to S102, the scores for the geographical regions involving the geographical names are computed based on the geographical information database. At the province level, for example, Sichuan province has Yingxiu, Wenchuan, Youxian District, Mianyang City, Jianhe, Panlong and Yingshan County found in the geographical names mentioned in the document. Because all these geographical names are places in Sichuan province at lower geographical region levels, the score of Sichuan as an geographical region totals to thirty-four. Zhejiang province has Shanmen and Ouhai, and has a total score of seven. The total score of Beijing is four.

According to the algorithm described at S103, Sichuan is identified to be the highest scoring geographical region among the comparable geographical regions which are at the same administrative level, namely Sichuan, Zhejiang and Beijing. Under the geographical region of Sichuan province, the scores for the geographical names are: Yingxiu: 5; Wenchuan: 8; Youxian District: 6; Mianyang City: 9; Jianhe: 2; Panlong: 2; Yingshan County: 2. The score for Mianyang City is the highest among those under Sichuan. Therefore, "Mianyang City, Sichuan province" is identified as the core geographical information of the document at the end.

It is noted that the choice of the geographical region level for this analysis is only exemplary. First, other levels such as country or state may be selected as the top geographical region level for comparison. Second, at any lower geographical region level, the score of a certain geographical name may be calculated using the algorithm of block S102. For example, if in addition to the appearance of Mianyang City, one or two other geographical names at further lower levels of Mianyang City are also found to appear in the document, the score of Mianyang city as a geographical name may be the sum of the score of all related geographical names including both Mianyang City itself and its sub-level geographical names. This may be the case whether in calculating the score of Mianyang City as a region above the other geographical names, or calculating the score of MJianyang as a geographical name under an upper-level geographical region (Sichuan).

As illustrated from the above exemplary embodiments, scores for geographical names are computed based on an appearance frequency of the respective geographical name and predefined weighted positional points. Using a geographical information database, scores for geographical regions involving the geographical names are computed. The highest scoring geographical name in the highest scoring geographical region is then taken as the core geographical information of the document. The score of a geographical name which appears at a position where core geographical information most likely appears is enhanced. Because the scores are calculated by giving account to the aggregating effect within each geographical region, the core geographical information in the document is determined more accurately.

However, calculating and comparing scores for geographical regions may be optional for the purpose of determining the core geographical information of a document. In one embodiment, after the scores for geographical names are calculated based on their frequencies of appearance in the document, the scores are directly compared to identify the highest scoring geographical name as the core geographical information of the document. This simplified procedure may be adequate when the scores for the geographical names are sufficiently distinct.

An example is given below for illustration. Suppose the document is a web page whose content contains geographical names such as Mao County, Wenchuan, Tumen and Ming River. The scores for these geographical names are obtained as follows: Mao County: 17; Wenchuan: 4; Tumen: 2; Ming River: 2.

Furthermore, these geographical names are places located in Sichuan province. Using the score method described herein, the computer determines that "Mao County" is the highest scoring geographical name, and is therefore determined to be the core geographical information is. Based on the geographical information database, the complete geographical information of the document is determined to be "Mao County, Aba Tibetan and Qiang Autonomous Prefecture, Sichuan Province, China".

The above-described method and procedures may be implemented using a computer or computer system, such as a server computer, as described below.

Figure 4:
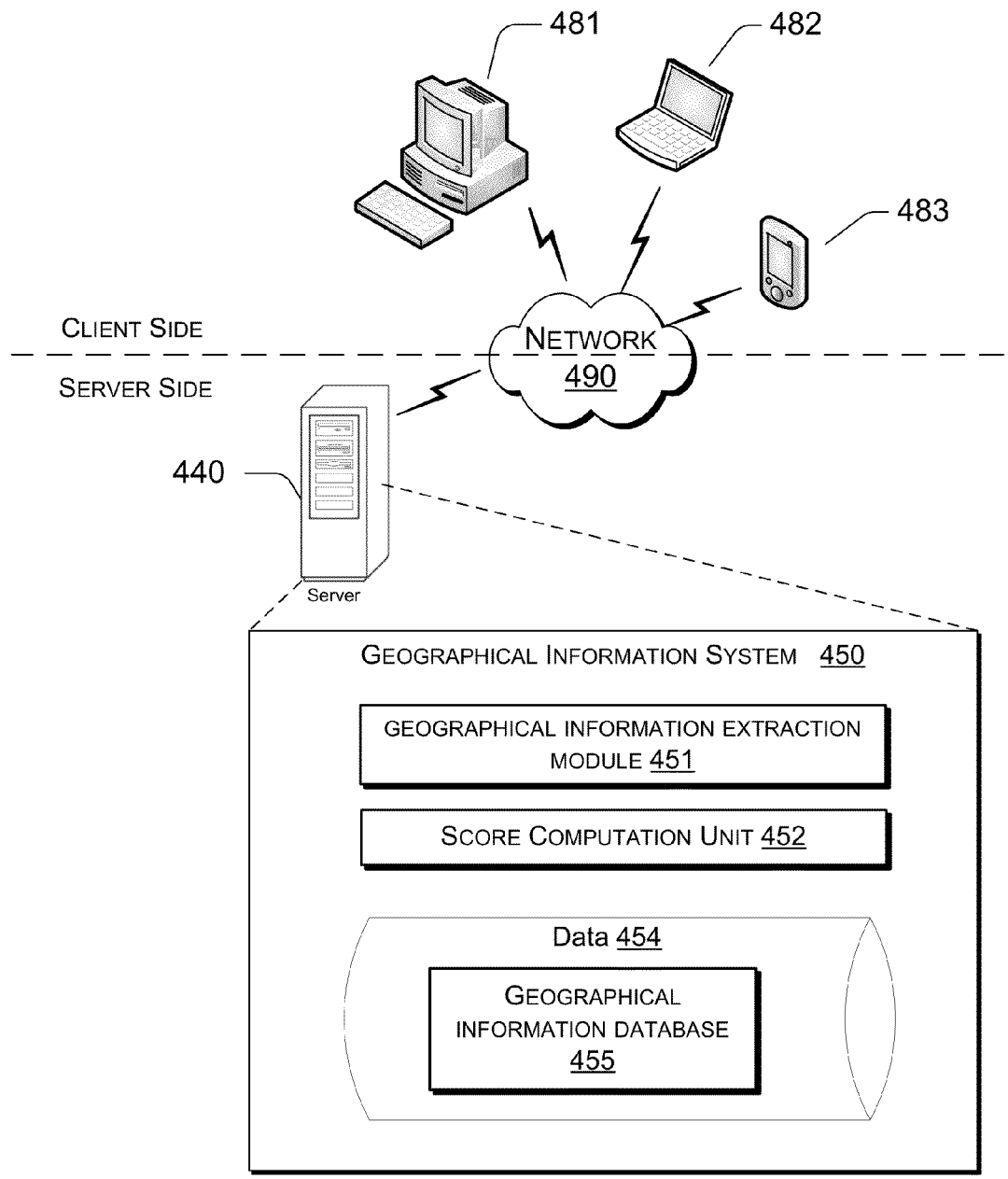
FIG. 4 shows a schematic structural diagram of an exemplary geographical information system in an exemplary environment.

FIG. 4 shows a schematic structural diagram of an exemplary geographical information system in an exemplary environment. Geographical information system 450 is placed in exemplary environment 400 for implementing the method of the present disclosure. As illustrated in environment 400, some components reside on a client side and other components reside on a server side. However, these components may reside in multiple other locations. Furthermore, two or more of the illustrated components may combine to form a single component at a single location.

The geographical information system 450 is implemented in a computer system 440 which is connected to client-side computing devices (client terminals) such as 481, 482 and 483 through network(s) 490, such that users (not shown) may access the geographical information system 450 through the client-side computing devices. In one embodiment, computing system 440 is a server, while client-side computing devices 481, 482 and 483 may each be a computer or a portable device, used as a user terminal. The server 440 may include common computer components such as processor(s), I/O devices, computer readable media, and network interface (not shown).

The computer readable media stores application program modules and data 454 (such as documents and geographical information database 455). Application program modules contain instructions which, when executed by processor(s), cause the processor(s) to perform actions of a process described herein. For example, the computer processor of server 440 may be programmed to extract geographical information from a document; compute scores for geographical names based on their frequencies of appears in a document and weighted positional points; compute scores for geographical regions which are related to the geographical names extracted from the document based on geographical information database 455; and identify the geographical region that has the highest score, and take the highest scoring geographical name in the identified geographical region to be the core geographical information of the document.

The core geographical information of a document may be used for providing geographically customized information that is more relevant to a certain group of people who are related to a geographical location identified by the core geographical information of the document.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing system or device may be any device that has a processor, an I/O device and a memory (either an internal memory or an external memory), and is not limited to a personal computer. Especially, computer system 440 may be a server computer, or a cluster of such server computers, connected through network(s) 490, which may either be the Internet or an intranet. Especially, the computer device 440 may be a web server, or a cluster of such servers hosting a website such as an e-commerce site.

In one embodiment, geographical information system 450 is configured to have various functional modules to perform the functions described herein. A document geographical information extraction module 451 is used for extracting geographical information from a document. A score computation unit 452 is used for calculating the scores of the geographical names extracted from the document using the algorithms described herein. A geographical information database 455 is used for storing geographical names, terms and phrases indicative of geographical names, and affiliated relationships among geographical names.

In the presence disclosure, a "module" or a "unit" in general refers to a functionality designed to perform a particular task or function. A module or a unit can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, not structural, and the functions of several units may be performed by a single combined device or component. When used in a computer-based system, regular computer components such as a processor, a storage and memory may be programmed to function as one or more units or devices to perform the various respective functions.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for determining core geographical information in a document, the method comprising:
   identifying appearances of a plurality of geographical names in the document,
   determining one or more frequencies of each geographical name's appearances in the document, the determining including:
      in response to determining that a particular appearance of a geographical name is within a name of a news agency, not counting the particular appearance of the geographical name within the name of the news agency in determining the core geographical information;
   assigning one or more positional weights to each geographical name according to positions of the geographical name's appearances in the document;
   computing a score of each geographical name based on the one or more frequencies and the one or more positional weights of the respective geographical name; and
   determining the core geographical information in the document based on the scores of the plurality of geographical names.

2. The method as recited in claim 1, wherein determining the core geographical information in the document based on the scores of the plurality of geographical names comprises:
   computing aggregated scores for a plurality of geographical regions at a comparable or common level, each geographical region being related to at least one of the plurality of geographical names which are at the same or lower levels relative to the geographical region;
   identifying a highest scoring geographical region among the plurality of geographical regions; and
   taking a highest scoring geographical name in the highest scoring geographical region to be the core geographical information of the document.

3. The method as recited in claim 2, wherein the plurality of geographical regions are identified using a geographical information database containing a list of geographical names and hierarchical relationships among the list of geographical names, the list of geographical names including the plurality of geographical names in the document.

4. The method as recited in claim 1, wherein determining the core geographical information in the document based on the scores of the plurality of geographical names comprises:
   identifying a highest scoring geographical name among the plurality of geographical names; and
   taking the highest scoring geographical name to be the core geographical information of the document.

5. The method as recited in claim 1, wherein computing the score of each geographical name comprises:
   computing a frequency score based on the one or more frequencies of the geographical name;
   computing a positional score based on the one or more positional weights of the geographical name; and
   adding the positional score to the frequency score to obtain the score of the geographical name.

6. The method as recited in claim 1, wherein assigning one or more positional weights to each geographical name comprises:
   identifying one or more position types where the geographical name appears in the document, the one or more position types including at least one of title, a first paragraph and other paragraphs in the document; and
   assigning a respective positional weight to each position type where the geographical name appears in the document.

7. The method as recited in claim 1, wherein computing the score of each geographical name comprises:
   increasing the score by a preset value if the respective geographical name appears conjunctively or consecutively with another geographical name.

8. The method as recited in claim 1, wherein the determining that the particular appearance of the geographical name is within the name of the news agency comprises determining that the name of the news agency appears in immediate proximity to the particular appearance of the geographical name in the document.

9. A method for determining core geographical information in a document, the method comprising:
   computing a score for each of a plurality of geographical names that appear in the document, the score of each geographical name being computed based on one or more frequencies and position types of a respective geographical name's appearances in the document;
   computing aggregated scores for multiple geographical regions at a comparable or a common level, a respective geographical region of the multiple geographical regions including one or more regions represented by at least one of the plurality of geographical names that are at a same level as or lower levels relative to the respective geographical region, an aggregated score of the respective geographical region including an aggregation of scores of the at least one of the plurality of geographical names whose represented regions are at the same level as or lower levels relative to the respective geographical region;
   identifying a geographical region with a highest aggregated score among the multiple geographical regions at the comparable or the common level; and
   finding a geographical name with a highest score whose represented region is within the geographical region with the highest aggregated score as the core geographical information of the document.

10. The method as recited in claim 9, wherein computing the score for each of the plurality of geographical names comprises:
    determining one or more frequencies of each geographical name's appearances in the document;

assigning one or more positional weights to each geographical name according to positions of the geographical name's appearances in the document; and computing the score of each geographical name based on the one or more frequencies and the one or more positional weights of the respective geographical name.

11. The method as recited in claim 10, wherein assigning one or more positional weights to each geographical name according to positions of the geographical name's appearances in the document comprises:

identifying one or more position types where the geographical name appears in the document, the one or more position types including at least one of title, a first paragraph and other paragraphs in the document; and assigning a respective positional weight to each position type where the geographical name appears in the document.

12. The method as recited in claim 9, wherein computing the score of each geographical name comprises:

computing a frequency score based on the one or more frequencies of the geographical name;

computing a positional score based on one or more positional weights of the geographical name; and adding the positional score to the frequency score to obtain the score of the geographical name.

13. The method as recited in claim 9, wherein computing the score of each geographical name comprises:

increasing the score by a preset value if the respective geographical name appears conjunctively or consecutively with another geographical name.

14. The method as recited in claim 10, wherein computing the score of each geographical name comprises:

ignoring an instance of the geographical name if a name of an agency appears in immediate proximity to the geographical name in the document.

15. A system for determining core geographical information in a document, the system comprises a computer having a processor and a data storage, the processor being programmed to perform the following acts:

identifying appearances of a plurality of geographical names in the document;

determining one or more frequencies of each geographical name's appearances in the document;

assigning one or more positional weights to each geographical name according to positions of the geographical name's appearances in the document;

computing a score of a respective geographical name based on the one or more frequencies and the one or more positional weights of the respective geographical name, the computing including:

in response to determining that the respective geographical name appears conjunctively or consecutively with another geographical name in the document, increasing a score of the respective geographical name and a score of the another geographical name; and determining the core geographical information in the document based on scores of the plurality of geographical names.

16. The system as recited in claim 15, wherein determining the core geographical information in the document based on the scores of the plurality of geographical names comprises:

computing aggregated scores for a plurality of geographical regions at a comparable or common level, each geographical region being related to at least one of the plurality of geographical names which are at the same or lower levels relative to the geographical region;

identifying a highest scoring geographical region among the plurality of geographical regions; and taking a highest scoring geographical name in the highest scoring geographical region to be the core geographical information of the document.

17. The system as recited in claim 15, wherein the data storage stores a geographical information database containing a list of geographical names and hierarchical relationships among the list of geographical names, the list of geographical names including the plurality of geographical names in the document.

18. The method as recited in claim 15, wherein the computer is a server connected to the Internet.

19. The method as recited in claim 9, wherein the computing aggregated scores for multiple geographical regions at a comparable or a common level comprises:

identifying the one or more regions represented by at least one of the plurality of geographical names and the multiple geographical regions according to a geographical information database.

20. The method as recited in claim 9, wherein the geographical information database comprises a list of geographical names and one or more hierarchical relationships among the list of geographical names.

\* \* \* \* \*